US008300530B2

(12) United States Patent
Chew et al.

(10) Patent No.: US 8,300,530 B2
(45) Date of Patent: Oct. 30, 2012

(54) DETECTING MEDIA RATE FOR MEASURING NETWORK JITTER

(75) Inventors: Earl Chew, Vancouver (CA); Kevin M. Cattell, North Vancouver (CA); Laura Choy, Burnaby (CA)

(73) Assignee: Ixia, Calabasas, CA (US)

( * ) Notice: Subject to any disclaimer, the term of this patent is extended or adjusted under 35 U.S.C. 154(b) by 661 days.

(21) Appl. No.: 11/672,860

(22) Filed: Feb. 8, 2007

(65) Prior Publication Data

US 2008/0192647 A1    Aug. 14, 2008

(51) Int. Cl.
*G06F 11/00* (2006.01)
(52) U.S. Cl. ........ 370/235; 370/231; 370/236; 370/230; 370/230.1
(58) Field of Classification Search ............... 370/468, 370/235, 230, 230.1, 236, 231
See application file for complete search history.

(56) References Cited

U.S. PATENT DOCUMENTS

| 5,287,182 | A |  | 2/1994  | Haskell et al. |
| 5,467,342 | A |  | 11/1995 | Logston et al. |
| 5,486,864 | A |  | 1/1996  | Zdepski |
| 5,533,021 | A |  | 7/1996  | Branstad et al. |
| 5,537,408 | A |  | 7/1996  | Branstad et al. |
| 5,640,388 | A |  | 6/1997  | Woodhead et al. |
| 5,668,841 | A |  | 9/1997  | Haskell et al. |
| 5,774,497 | A |  | 6/1998  | Block et al. |
| 5,883,924 | A |  | 3/1999  | Siu et al. |
| 6,563,796 | B1 | * | 5/2003  | Saito .............................. 370/252 |
| 7,321,565 | B2 | * | 1/2008  | Todd et al. .................... 370/253 |
| 2002/0167911 | A1 | * | 11/2002 | Hickey ........................... 370/252 |
| 2005/0201399 | A1 | * | 9/2005  | Woodward et al. ........... 370/412 |

OTHER PUBLICATIONS

"International Standard ISO/IEC 13818-1", Dec. 1, 2000, Second Edition.*
J. Welch, J. Clark, A Proposed Media Delivery Index (MDI), Apr. 2006, Cisco Systems, Request for Comments: 4445.*
"IPTV QoE: Understanding and Interpreting MDI Values," Agilent Technologies White Paper, http://cp.literature.agilent.com/litweb/pdf/5989-5088EN.pdf, pp. 1-6 (Aug. 30, 2006).
Notice of Allowability for U.S. Appl. No. 08/878,423 (Sep. 17, 1998).
Notice of Allowance and Fee(s) Due for U.S. Appl. No. 08/632,036 (Feb. 3, 1998).
European Search Report for European application No. 96 11 6500 (Dec. 23, 1997).
Official Action for U.S. Appl. No. 08/632,036 (Oct. 8, 1997).

* cited by examiner

*Primary Examiner* — Huy D Vu
*Assistant Examiner* — Omer Mian
(74) *Attorney, Agent, or Firm* — Jenkins, Wilson, Taylor & Hunt, P.A.

(57) ABSTRACT

A method and apparatus for measuring network performance. A stream of packets of encoded data, sent by a transmitter across a network, are received. The stream of packets includes (n+1) packets having transmittal timestamps from a clock local to the transmitter, where n is an integer greater than or equal to one. An $(n+1)^{th}$ transmittal timestamp and an $n^{th}$ transmittal timestamp are determined. A value is calculated based on the $(n+1)^{th}$ and the $n^{th}$ transmittal timestamps. The value corresponds to the size of a virtual buffer needed to store the packets during a measurement interval. The value is used to determine a performance measure for the network.

18 Claims, 3 Drawing Sheets

DETECTING MEDIA RATE FOR MEASURING NETWORK JITTER

BACKGROUND

Digital multimedia content (e.g. video and/or audio data) must be transported across communication networks in a reliable and timely manner to the end user. Streaming video services (e.g. Internet Protocol television (IPTV), video conferencing, video-on-demand, etc.) are especially sensitive to delay, jitter, or data loss, which can all negatively impact the quality of the end user's experience. Typically, digital multimedia content is encoded prior to transmission across the network. Part 1 (Systems) of the Moving Pictures Expert Group (MPEG-2) standard defines a Transport Stream (TS) for encoding and transporting multimedia content across somewhat unreliable mediums such as broadcast channels, internet protocol networks, etc. The Transport Stream consists of packets that carry video or audio data in their payload. The TS packets are received and decoded to reconstruct the original multimedia content. The Transport Stream protocol is also specified in International Standard ISO/IEC13818-1.

Determining the performance of a network that carries digital multimedia content is an important element to the successful design and operation of such a network. One measure of a network's performance is known as the Media Delivery Index (MDI). The MDI has two components: the delay factor (DF) and the media loss rate (MLR). The MDI is expressed as two numbers separated by a colon: DF:MLR.

The DF component of the MDI is the maximum difference, observed at the end of each network packet, between the arrival of media data and the drain of media data. DF is indicative of the packet jitter. A high value for DF indicates that a larger buffer depth is required to minimize the effects of packet jitter. To calculate DF, consider a virtual buffer VB used to buffer received packets of a stream. Each time a packet $P_i$, where $i>0$, arrives during a measurement interval, compute two VB values, VB(i,pre) and VB(i,post) as follows:

$$VB(i, pre) = \sum_{j=1}^{i-1} S_j - MR \cdot T_i \quad (1)$$

$$VB(i, post) = VB(i, pre) + S_i \quad (2)$$

where $S_j$ is the media payload size of the $j^{th}$ packet in the measurement interval, $T_i$ is the arrival time relative to the last received packet in the previous measurement interval, or in the case of the first measurement interval, relative to the first packet. MR is the nominal media rate in bytes per second. VB(i,pre) is the virtual buffer size just before the arrival of $P_i$, and VB(i,post) is the virtual buffer size just after the arrival of $P_i$. This calculation is subject to the initial condition of VB(0,post)=VB(0,pre)=0 and VB(1,pre)=−MR·T$_1$ at the beginning of each measurement interval. A measurement interval is defined from just after the time of arrival of the last packet during a nominal period to the time just after the arrival of the last packet of the next nominal period. The length of the measurement interval is arbitrary and may vary from application to application, but is typically selected to be 1 second.

The nominal media rate can be variable or constant. If there is a constant bit rate (CBR), the transmission of the media stream is defined to be constant at the bit level. If there is a variable bit rate (VBR), the rate can vary, but is defined to be piece-wise constant, as defined in the Detailed Description. The prior art DF is well defined for the CBR case only.

The DF is calculated once every measurement interval as follows by finding the difference between the maximum and minimum values of VB:

$$DF = \frac{\max_{i \geq 0}(VB(i, post)) - \min_{i \geq 0}(VB(i, pre))}{MR} \quad (3)$$

Note that the maximum and minimum include the zeros introduced by the initial conditions at i=0.

The MLR is defined as the number of lost or out-of-order packets per second.

For more information regarding the MDI, DF, and MLR measurements, please refer to the following publications: "A Proposed Media Delivery Index (MDI)", by J. Welch and J. Clark, published in April 2006 by the Internet Engineering Task Force as IETF RFC 4445 and available at the following URL: http://www.rfc-editor.org/rfc/rfc4445.txt; and "IPTV QoE: Understanding and Interpreting MDI Values", a white paper published by Agilent Technologies on Aug. 30, 2006 and available at the following URL: http://cp.literature.agilent.com/litweb/pdf/5989-5088EN.pdf An obstacle in calculating the DF is determining the media rate MR. One value to use is the embedded media rate (also referred to as the "elementary stream rate"), which is encoded at a lower level in the program elementary stream (PES) from which the TS packets are created by an MPEG-2 encoder. The embedded media rate is the number of bits per unit time needed to represent the video or audio data only. However, significant processing is required to extract the embedded media rate from these lower level encodings—the received TS packets must first be decoded by the decoder to reconstruct the PES, before the media rate can be extracted from the PES. This process is complex and requires significant hardware and software resources. Furthermore, to perform it in a scalable fashion, the test equipment must parse the PES stream over hundreds of simultaneous video channels, which is typical in an IPTV network. In addition, the embedded media rate is not an accurate representation of the true media rate, because it does not include the necessary MPEG transport overhead required to transmit the payloads.

Therefore, there remains a need for an improved method and apparatus for determining DF.

DETAILED DESCRIPTION

Figure 1:
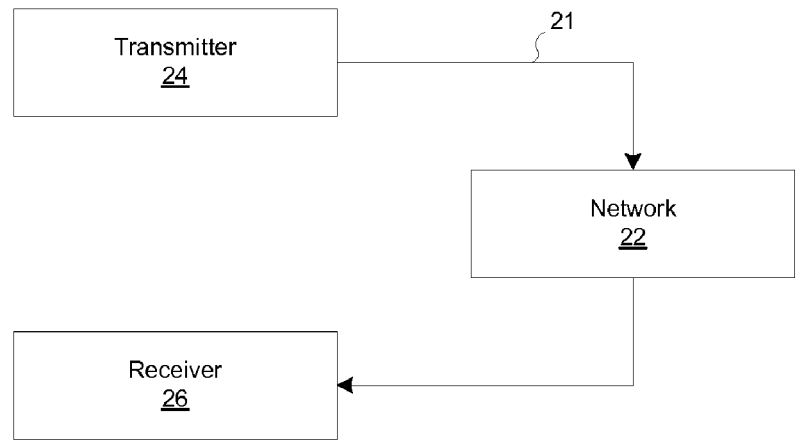
FIG. 1 shows a block diagram of a system for sending a transport packet stream across a network.

FIG. 1 shows a block diagram of a system for sending a transport packet stream 21 across a network 22. The transport packet stream consists of Transport Stream (TS) packets, encoded according to the ISO/IEC 13818-1 MPEG-2 standard. A transmitter 24 inserts Program Clock Reference (PCR) timestamps into selected TS packets according to the ISO/IEC 13818-1 MPEG-2 standard, and transmits the transport packet stream 21 across the network 22 to a receiver 26. For a variable bit rate (VBR) transmission, the stream rate is defined to be constant between successive PCRs. As will be described below, the calculation for DF can be simplified by using these PCR timestamps that are already included within the TS packets.

Figure 2:
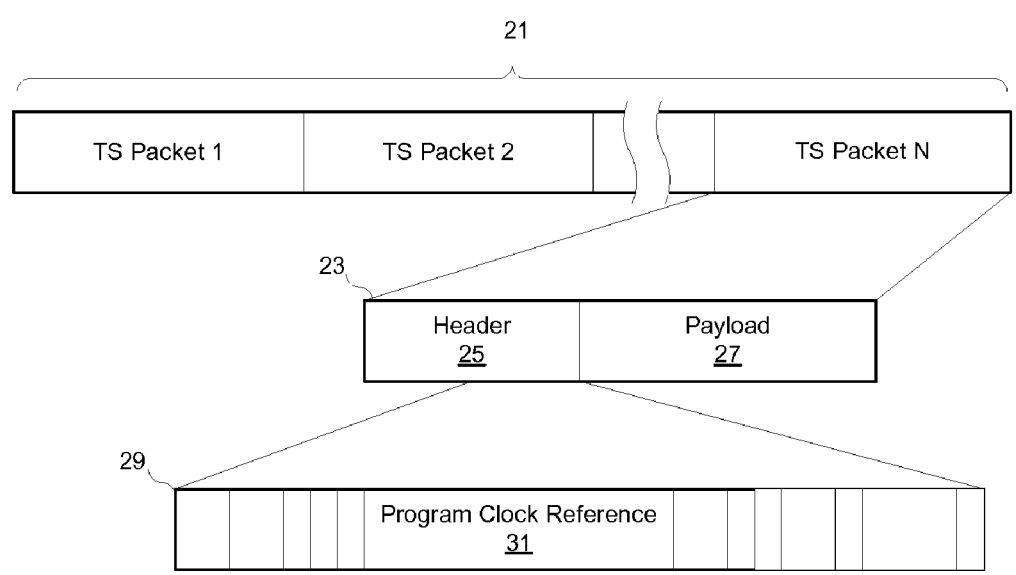
FIG. 2 shows an exploded view of an exemplary transport packet stream having N transport stream packets.

FIG. 2 shows an exploded view of the transport packet stream 21, having N TS packets. (It should be noted that if network 22 is an internet protocol (IP) network, seven TS packets 23 are normally grouped together into an Ethernet frame for transmission). Each TS packet 23 has a header 25 and a payload 27. The header 25 in FIG. 2 contains an adaptation field 29, although this field is optional. Within the adaptation field 29 is the Program Clock Reference 31 (PCR), which is a timestamp from a system clock within an MPEG-2 encoder in the transmitter 24 that is inserted at the time the packet is transmitted. The PCR 31 is 48 bits long and consists of 2 sections. The first section is 33 bits wide, and includes a 90 kHz clock. The second section is 9 bits wide, and is a 27 MHz clock. The remaining 6 bits are reserved.

The PCR 31 is recovered by the receiver 26 and used as a reference for two other timestamps within the transport stream layer: the decoding timestamp (DTS) and the presentation timestamp (PTS). The DTS and PTS specify the time instants at which the packet should be decoded and presented, respectively. The PCR 31 is a necessary field because the DTS and PTS use it as a reference base—without the PCR 31, the TS packets 23 could not be decoded at the proper time. The MPEG-2 standard requires that the PCR 31 be provided at least once every 100 milliseconds (although the PCR 31 could be included more often), but not every TS packet 23 needs to include a PCR 31. The standard also requires that the value of the PCR be accurate to within 500 nanoseconds of the actual scheduled transmission time.

Figure 3:
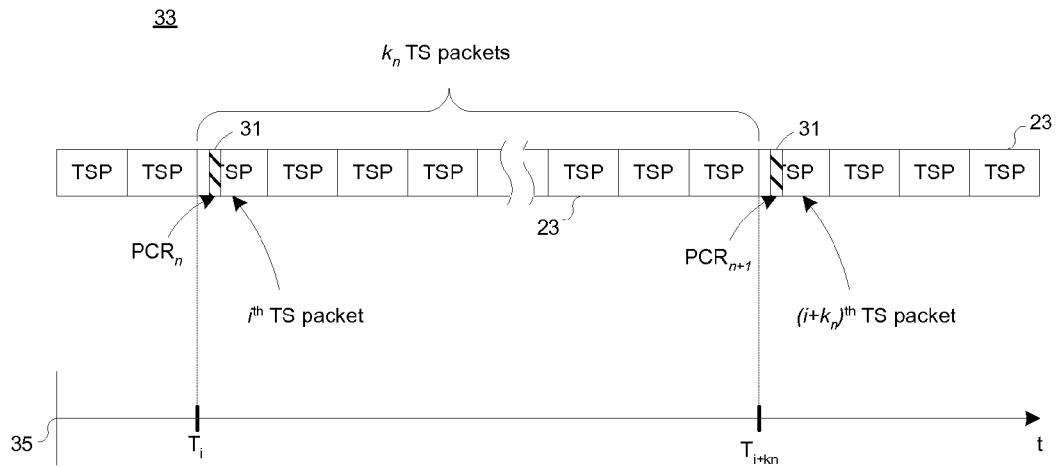
FIG. 3 shows a plot of an exemplary transport packet stream against a timeline as it arrives at the receiver.

FIG. 3 shows a plot of an exemplary transport packet stream 33 against a timeline 35 as it arrives at the receiver 26. The figure shows the arrival at time $T_i$ of the packet bearing the $n^{th}$ PCR, and the subsequent packets, $k_n$ in total, until the arrival of a TS packet containing the next PCR, where i, k and n are integers greater than or equal to one. As previously mentioned, seven TS packets 23 are normally grouped together into an Ethernet frame for transmission across an internet protocol network, so the TS packets would normally arrive bunched up in groups of seven packets at a time. However, for the sake of generalization beyond one specific implementation, the TS packets are illustrated in FIG. 3 as arriving in a continuous stream without their Ethernet frames.

Define the functions X(i,pre) and X(i,post) for each packet i as follows:

$$X(i, pre) = \frac{VB(i, pre)}{MR} \quad (4)$$

$$X(i, post) = \frac{VB(i, post)}{MR} \quad (5)$$

Then DF can be expressed as $$DF = \max_{i \geq 0} (X(i, post)) - \min_{i \geq 0} (X(i, pre)) \quad (6)$$

Now consider the interval between the $n^{th}$ and $n+1^{st}$ PCR-bearing packets. Let $k_n$ be the number of packets in this interval, as shown in FIG. 3. For i>1, define $\Delta t_i$ to be the time between the arrival of the $i^{th}$ and $(i-1)^{st}$ packets, then X(i,pre) satisfies the recurrence:

$$X(i, pre) = X(i-1, pre) + \frac{PCR_{n+1} - PCR_n}{k_n} - \Delta t_i \quad (7)$$

Note that
$X(1, pre) = -T_1$
Also, then $$X(i, post) = X(i, pre) + \frac{PCR_{n+1} - PCR_n}{k_n} \quad (8)$$

When the data stream is CBR, the following derivation can be used to show that equation (7) is an accurate calculation for DF. First, equation (4) is repeated below for the convenience of the reader:

$$X(i, pre) = \frac{VB(i, pre)}{MR} \quad (4)$$

After substituting in equation (1) for the term VB(i,pre), $$X(i, pre) = \sum_{j=1}^{i-1} \frac{S_j}{MR} - T_i \quad (9)$$

Then, the summation term on the right side of equation (9) is expanded to pull out the case where j=i-1:

$$X(i, pre) = \left[\sum_{j=1}^{i-2} \frac{S_j}{MR} - T_{i-1}\right] + \frac{S_{i-1}}{MR} - (T_i - T_{i-1}) \quad (10)$$

$$X(i, pre) = X(i-1, pre) + \frac{S_{i-1}}{MR} - \Delta t_i \quad (11)$$

where $\Delta t_i$ is the time between the arrival of the $i^{th}$ and $(i-1)^{th}$ packets. The term $S_{i-1}/MR$ is the amount of time expected for the transmitter to send the $(i-1)^{th}$ TS packet, which is equal to the ratio of the difference between consecutive PCR timestamps, and the number of packets transmitted between the PCR timestamps. Therefore:

$$\frac{S_{i-1}}{MR} = \frac{PCR_{n+1} - PCR_n}{k_n} \quad (12)$$

Replacing the equivalent term for $S_{i-1}/MR$ in equation (12) back into equation (11), equation (7) is obtained:

$$X(i, pre) = X(i-1, pre) + \frac{PCR_{n+1} - PCR_n}{k_n} - \Delta t_i \quad (7)$$

Note that equation (7) generalizes to data streams that are VBR, in a well-defined and naturally-defined manner, since VBR is piece-wise CBR. Unlike the derivation for the CBR case, this generalization cannot be derived from the original definition of DF in RFC 4445.

In essence, the packet size $S_j$ and media rate MR in the prior art formulation of DF can be expressed using the expected time between packet arrivals, which can be computed from the expression:

$$\frac{PCR_{n+1} - PCR_n}{k_n} \quad (13)$$

The value $k_n$ can be obtained by counting packets, assuming there is no loss, or by comparing sequence numbers of the packets, which are available under some encapsulations. Since the MLR component of the MDI measurement would indicate when a packet loss occurred, MLR should be taken into consideration to determine the accuracy and validity of the DF measure.

Equations (7) and (8) are calculated using only the difference between two PCR timestamps, the packet counts $k_n$, and the time elapsed $\Delta t_i$ between the packet arrivals. No determinations need to be made as to the size of the packets at all, as required by the prior art equations for calculating DF. The PCR values, $k_n$, and $\Delta t_i$ are also relatively easy to extract from a TS packet stream, compared to the difficulties involved in reconstructing the PES to extract the embedded media rate. Thus, equations (7) and (8) are a simpler alternative to the prior art method.

Furthermore, using equations (7) and (8) results in a more accurate gauge of the network performance, since this method includes the overhead for protocol requirements and reflects the true transport rate of the multimedia data. Also, since these calculations rely on the actual media rate rather than a pre-defined fixed media rate (e.g. the embedded media rate), equations (7) and (8) are valid for both constant bit rate and variable bit rate transmissions.

The disclosed embodiments can be extended for Multiple Program Transport Stream (MPTS) if all elementary streams (ES) within the stream share a common reference time.

Figure 4:
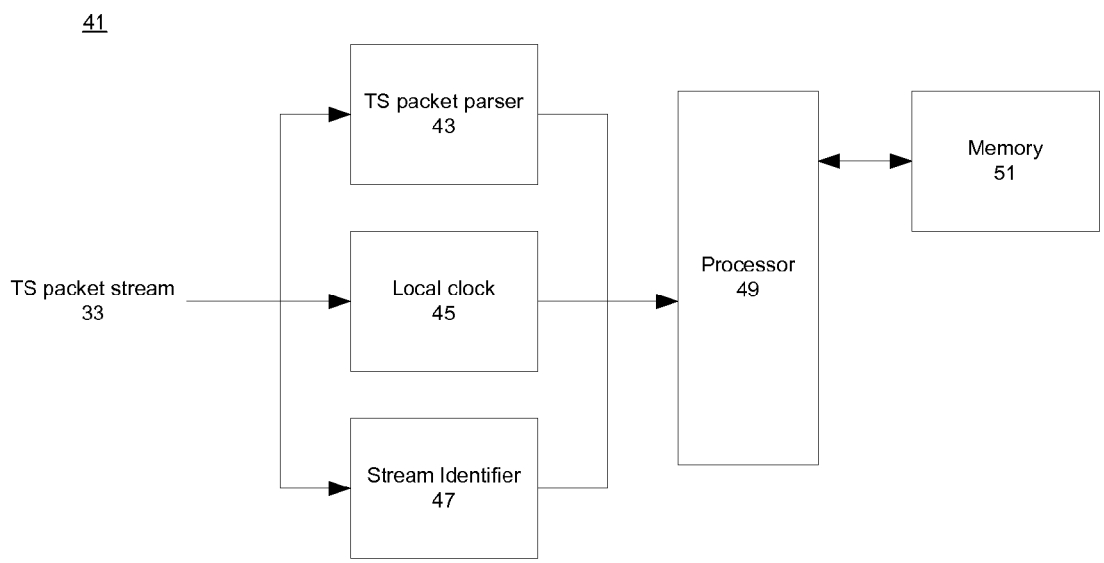
FIG. 4 is a block diagram of a system for calculating a delay factor for a network.

FIG. 4 is a block diagram of a system 41 for calculating a DF for a network. The system 41 is part of the receiver 26 shown in FIG. 1. The system 41 includes a TS packet parser 43, a local clock 45, a stream identifier 47, a processor 49, and a memory 51.

The TS packet parser 43 parses the incoming TS packet stream 33 to identify the TS packets containing PCRs, and to extract the PCRs. The TS packet parser 43 also counts the incoming TS packets, for example, by using an internal counter or by comparing sequence numbers of the packets, which are available under some encapsulations. The processor 49 receives the extracted PCRs and the packet count from the TS packet parser 43. The local clock 45 determines the local time of arrival for the TS packets and associates an arrival timestamp with each TS packet. The stream identifier 47 identifies which video stream the TS packets belong to, which is necessary in multi-stream applications such as IPTV. The processor 49 receives the arrival timestamps from the local clock 45 and stores them. The processor 49 receives the identified video stream from stream identifier 47 to determine which video stream the PCRs and arrival timestamps correspond to. Local memory 51 is used store the arrival timestamps and PCRs.

The processor 49 calculates X(i,pre) according to equation (7) and X(i,post) according to equation (8) for each arrived packet i, and stores the result in the memory 51. The processor 49 also determines the maximum X(i,post) and minimum X(i,pre) during each measurement interval and then calculates DF according to equation (6).

Figure 5:
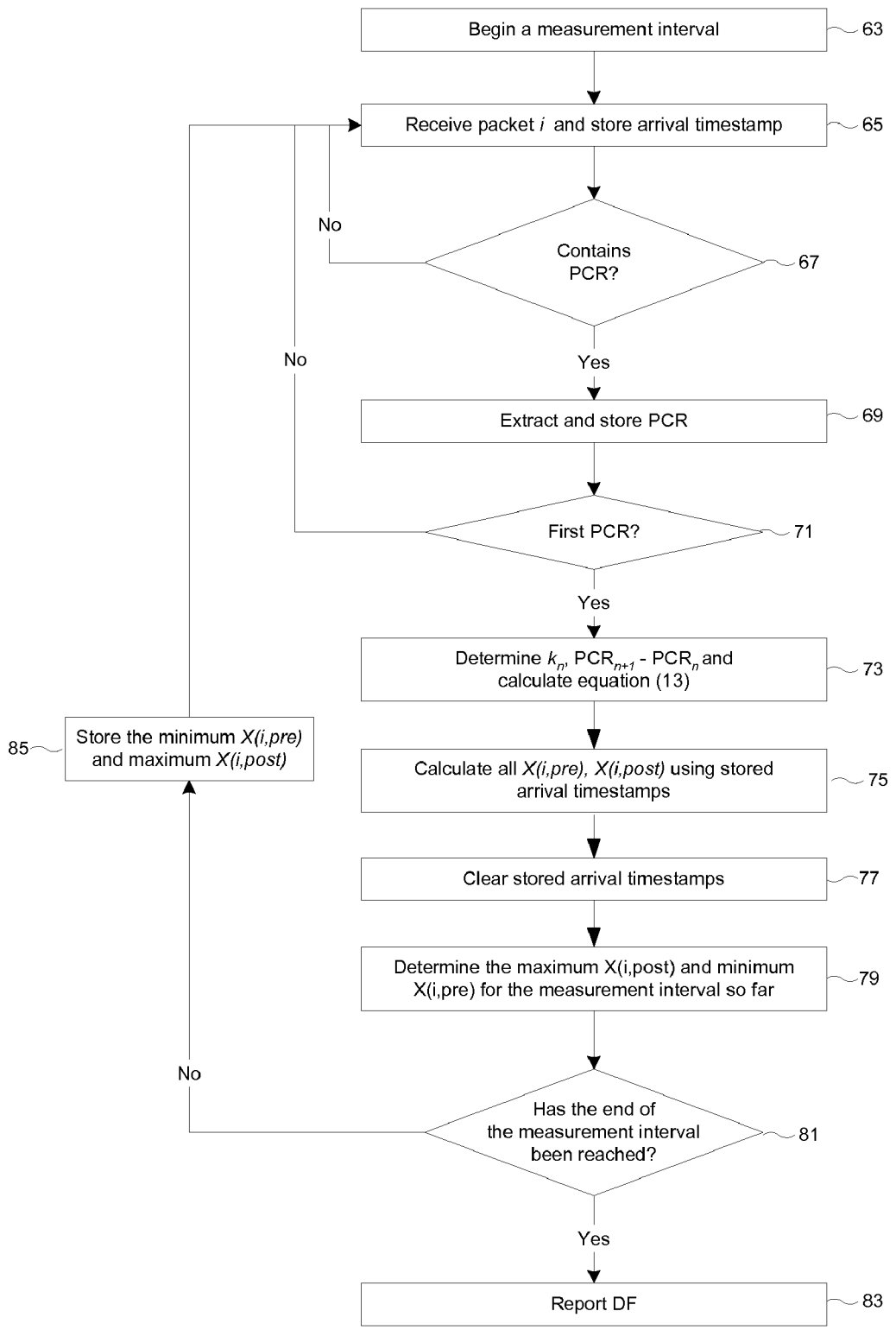
FIG. 5 shows a flow chart for a method for calculating the delay factor.

FIG. 5 shows a flow chart for a method for calculating the delay factor. In step 63 the measurement interval begins. In step 65 packet i is received and its arrival timestamp is stored. In step 67 the packet is examined for a PCR. If one is not present, the next packet is processed. If a PCR is present, the PCR is extracted and stored in memory in step 69. In step 71, a check is made as to whether this is the first PCR that has been received. (At least two PCRs must have been received in order to calculate the term $$\frac{PCR_{n+1} - PCR_n}{k_n}$$

in equations (7) and (8).) If it is the first PCR, the next packet is processed. If this is not the first PCR, equation (13) is computed in step 73. In step 75, equations (7) and (8) are computed using the stored arrival timestamps to get values for X(i,pre) and X(i,post) In step 77, the arrival timestamps are cleared. In step 79, the minimum and maximum of the computations in step 75 are determined. If this is not the end of the measurement interval, the maximum X(i,post) and minimum X(i,pre) up to this point in the measurement interval are stored in step 85 and processing continues. Otherwise, the DF is calculated and reported in step 83.

In one embodiment, the term $$\frac{PCR_{n+1} - PCR_n}{k_n} \quad (13)$$

can be initially computed once and used as a constant throughout the measurement interval. This can be done when the data stream is CBR across the measurement interval, and simplifies the calculations even further. As each packet arrives, X(i,pre) and X(i,post) from equations (7) and (8) can be simply computed using the constant value above in equation (13) and the packet inter-arrival time $\Delta t_i$. Any other PCR values in packets that arrive within the same measurement interval may be ignored.

In one embodiment, equations (7) and (8) can also be used to define a coarse-grained version of the DF, denoted DF', that is simpler to compute. Instead of examining the inter-arrival time for each packet, only inter-arrival times of the PCR-bearing packets are considered. Thus equations (7) and (8) simplify to:

$$X'(n,\text{pre}) = X'(n-1,\text{pre}) + (PCR_n - PCR_{n-1}) - (T'_n - T'_{n-1}) \quad (14)$$

and $$X'(n,\text{post}) = X'(n,\text{pre}) + (PCR_{n+1} - PCR_n) \quad (15)$$

where $T'_n$ is the arrival time of the packet bearing $PCR_n$ relative to the last PCR-bearing packet in the previous measurement interval, or in the case of the first measurement interval, relative to the first PCR-bearing packet. Then $$X'(0,\text{pre}) = X'(0,\text{post})$$

$$X'(1,\text{pre}) = -T_1.$$

DF' is then expressed as:

$$DF' = \max_{n \geq 0}(X'(n,\text{post})) - \min_{n \geq 0}(X'(n,\text{pre})) \quad (16)$$

Note that the $k_n$ and the associated division are not necessary for this measurement. These equations require only the difference between two PCR timestamps, and the time lapse between the receipt of the TS packets carrying those timestamps. While equations (14) and (15) do not return exactly the same results as a full DF calculation, they offer a good approximation. It should be noted that since the PCR 31 is only required to be inserted once every 100 milliseconds, the values X(n,pre) and X(n,post) have an error term of this magnitude.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method, comprising:
receiving a stream of packets of encoded data sent by a transmitter across a network, the stream of packets including n+1 packets having transmittal timestamps from a clock local to the transmitter, n being an integer greater than or equal to one and wherein the stream of packets further includes at least one packet that does not contain a transmittal timestamp from a clock local to the transmitter;
determining an n+$1^{th}$ transmittal timestamp; determining an nth transmittal timestamp;
determining a number of packets k received between the n+$1^{th}$ transmittal timestamp and the nth transmittal timestamp;
calculating an expected time interval between consecutive packets based on k and the n+$1^{th}$ and the nth transmittal timestamps;
using the calculated expected time interval between consecutive packets and a measured time interval between consecutive packets in the stream of packets to calculate a maximum theoretical time interval between consecutive packets; and
calculating a Delay Factor (DF) of a Media Delivery Index (MDI) for the network based on the calculated maximum theoretical time interval between consecutive packets,
wherein calculating an expected time interval per packet based on the n+$1^{th}$ and the $n^{th}$ transmittal timestamps further comprises:
determining a first difference between the n+$1^{th}$ and the $n^{th}$ transmittal timestamps
wherein calculating an expected time interval per packet based on k and the n+$1^{th}$ and the nth transmittal timestamps comprises:
determining a ratio of the first difference to k;
calculating a first factor based on the ratio, wherein the first factor corresponds to a size of a virtual buffer just before arrival of a selected packet; and
calculating a second factor based on the ratio, wherein the second factor corresponds to a size of the virtual buffer just after arrival of the selected packet.

2. A method as in claim 1, wherein the encoded data is encoded according to the International Standard ISO/IEC 13818-1.

3. A method as in claim 1, wherein the transmittal timestamps serve as a reference base for decoding the packets at a predetermined time.

4. A method as in claim 3, wherein the transmittal timestamps are Program Clock References according to the International Standard ISO/IEC 13818-1.

5. A method as in claim 1, wherein the packets carry data for a streaming video service.

6. A method as in claim 5, wherein the streaming video service is selected from the group consisting of Internet Protocol television (IPTV), video conferencing, and video-on-demand.

7. A method as in claim 1, further comprising:
calculating the first and second factors for each packet received, each time a packet having a transmittal timestamp arrives within the measurement interval;
determining a minimum first factor within the measurement interval;
determining a maximum second factor within the measurement interval; determining a second difference between the minimum first factor and the maximum second factor; and
using the second difference as the performance measure for the network.

8. A method as in claim 1, wherein calculating the first factor is further based on a first arrival time difference between receiving the selected packet, and receiving the packet before the selected packet.

9. A method as in claim 1, wherein the ratio is determined once within a measurement interval and used a plurality of times in calculating the first and second factors.

10. A method as in claim 1, further comprising
determining an (n−$1)^{th}$ transmittal timestamp;
calculating a second value based on the (n−$1)^{th}$ transmittal timestamp and the $n^{th}$ transmittal timestamp; and
using the second calculated value to determine the Delay Factor for the network.

11. A method as in claim 10, wherein calculating a second value is further based on:
determining a second arrival time difference between receiving the packet bearing the (n+$1)^{th}$ transmittal timestamp, and receiving the packet bearing the $n^{th}$ transmittal timestamp.

12. An apparatus, comprising: a receiver that receives a stream of packets of encoded data sent by a transmitter across a network, the stream of packets including n+1 packets having transmittal timestamps from a clock local to the transmitter, n being an integer greater than or equal to zero and wherein the stream of packets further includes at least one packet that does not contain a transmittal timestamp from a clock local to the transmitter;
a parser that parses the stream of packets, extracts an n+$1^{th}$ transmittal timestamp, and extracts an nth transmittal timestamp;
a clock that clocks an actual arrival time for each packet for determining the actual arrival time between consecutive packets in the stream of packets; and
a processor that determines a number of packets k received between the nth and n+$1^{th}$ transmittal timestamps and calculates an expected time interval between consecutive packets based on k, and the n+$1^{th}$ and the $n^{th}$ transmittal timestamps that uses the calculated time interval between consecutive packets and a measured time interval between consecutive packets to calculate a maximum theoretical time interval between consecutive packets, and that calculates a Delay Factor (DF) of a Media Delivery Index (MDI) for the network based on the calculated maximum theoretical time interval between consecutive packets,
wherein calculating an expected time interval per packet based on the n+$1^{th}$ and the $n^{th}$ transmittal timestamps further comprises:
determining a first difference between the n+$1^{th}$ and the $n^{th}$ transmittal timestamps
wherein calculating an expected time interval per packet based on k and the n+$1^{th}$ and the nth transmittal timestamps comprises:
determining a ratio of the first difference to k;

calculating a first factor based on the ratio, wherein the first factor corresponds to a size of a virtual buffer just before arrival of a selected packet; and calculating a second factor based on the ratio, wherein the second factor corresponds to a size of the virtual buffer just after arrival of the selected packet.

13. An apparatus as in claim 12, further comprising:
a counter that counts packets from the nth transmittal timestamp to the $(n+1)^{th}$ transmittal timestamp.

14. A method, comprising: receiving a stream of packets of encoded data sent by a transmitter across a network, the stream of packets including a plurality of packets that do not include transmittal timestamps and n+1 packets having transmittal timestamps from a clock local to the transmitter, n being an integer greater than or equal to one and wherein the stream of packets further includes at least one packet does not contain a transmittal timestamp from a clock local to the transmitter;

determining an $n+1^{th}$ transmittal timestamp;
determining an $n^{th}$ transmittal timestamp;
determining a first difference between the $n+1^{th}$ and the nth transmittal timestamps;
determining a packet count k from the $n^{th}$ transmittal timestamp to the $n+1^{th}$ transmittal timestamp;
determining a ratio of the first difference to the packet count;
calculating a first factor based on the ratio, wherein the first factor corresponds to an expected amount of time to drain a virtual buffer just before arrival of a selected packet;
calculating a second factor based on the ratio, wherein the second factor corresponds to an expected amount of time to drain the virtual buffer just after arrival of the selected packet; and
using the first and second factors and an actual inter-arrival time between consecutive packets having transmittal timestamps to determine a Delay Factor (DF) of a Media Delivery Index (MDI) for the network.

15. The method of claim 14, wherein using the first and second factors to determine a performance measure for the network comprises:
calculating the first and second factors for each packet received, each time a packet having a transmittal timestamp arrives within a measurement interval;
determining a minimum first factor within the measurement interval;
determining a maximum second factor within the measurement interval;
determining a second difference between the minimum first factor and the maximum second factor; and
using the second difference as the performance measure for the network.

16. The method of claim 1, wherein the transmittal timestamps, comprise program clock reference timestamps.

17. The apparatus of claim 12, wherein the transmittal timestamps comprise program clock reference timestamps.

18. The method of claim 14, wherein the transmittal timestamps comprise program clock reference timestamps.

* * * * *